United States Patent
Tien et al.

(10) Patent No.: US 9,026,973 B2
(45) Date of Patent: May 5, 2015

(54) SYSTEM AND METHOD FOR ARBITRARY METAL SPACING FOR SELF-ALIGNED DOUBLE PATTERNING

(71) Applicant: Taiwan Semiconductor Manufacturing Co., Ltd., Hsin-Chu (TW)

(72) Inventors: Li-Chun Tien, Tainan (TW); Chen-Chi Wu, Hsinchu (TW); Kuo-Ji Chen, Wu-ku (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

(21) Appl. No.: 13/888,405

(22) Filed: May 7, 2013

(65) Prior Publication Data

US 2014/0264894 A1   Sep. 18, 2014

Related U.S. Application Data

(60) Provisional application No. 61/782,249, filed on Mar. 14, 2013.

(51) Int. Cl.
*G06F 17/50* (2006.01)
*H01L 21/033* (2006.01)

(52) U.S. Cl.
CPC ............ *G06F 17/50* (2013.01); *H01L 21/0337* (2013.01)

(58) Field of Classification Search
CPC . G06F 17/5081; G06F 17/50; G06F 2217/84; G06F 1/36; G06F 1/38; G06F 7/70433
USPC ......................................... 716/110, 122, 127
See application file for complete search history.

(56) References Cited

U.S. PATENT DOCUMENTS

| | | | |
|---|---|---|---|
| 7,865,852 B2 * | 1/2011 | Chen ............................. | 716/126 |
| 8,434,043 B1 * | 4/2013 | Hsu et al. ...................... | 716/113 |
| 8,667,443 B2 * | 3/2014 | Smayling et al. ............. | 716/119 |
| 8,671,368 B1 * | 3/2014 | Salowe et al. .................. | 716/55 |
| 8,701,056 B1 * | 4/2014 | Friedberg et al. ............... | 716/55 |
| 8,782,586 B2 * | 7/2014 | Sezginer et al. .............. | 716/126 |
| 2002/0066939 A1 * | 6/2002 | Metzler ......................... | 257/594 |
| 2008/0222587 A1 * | 9/2008 | Smayling et al. ................. | 716/7 |
| 2009/0193379 A1 * | 7/2009 | McElvain et al. ............... | 716/12 |
| 2011/0214100 A1 * | 9/2011 | McElvain ..................... | 716/130 |
| 2012/0091592 A1 * | 4/2012 | Chen et al. .................... | 257/773 |
| 2012/0288786 A1 * | 11/2012 | Huang et al. ...................... | 430/5 |

* cited by examiner

Primary Examiner — Brian Ngo
(74) Attorney, Agent, or Firm — Duane Morris LLP

(57) ABSTRACT

An integrated circuit includes a first conductive structure of a device configured to have a first voltage potential, a second conductive structure of the device configured to have a second voltage potential that is different than the first voltage potential, and a peacekeeper structure disposed between and separating the first conductive structure and the second conductive structure. The peacekeeper structure is separated from at least one of the first conductive structure and the second conductive structure by a fixed spacing distance for conductive lines for a self-aligned double patterning ("SADP") process from the integrated circuit was formed.

15 Claims, 12 Drawing Sheets

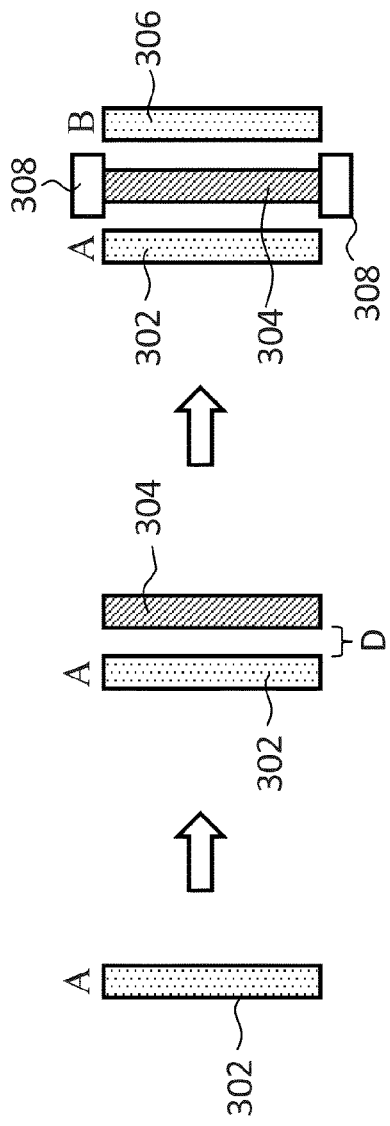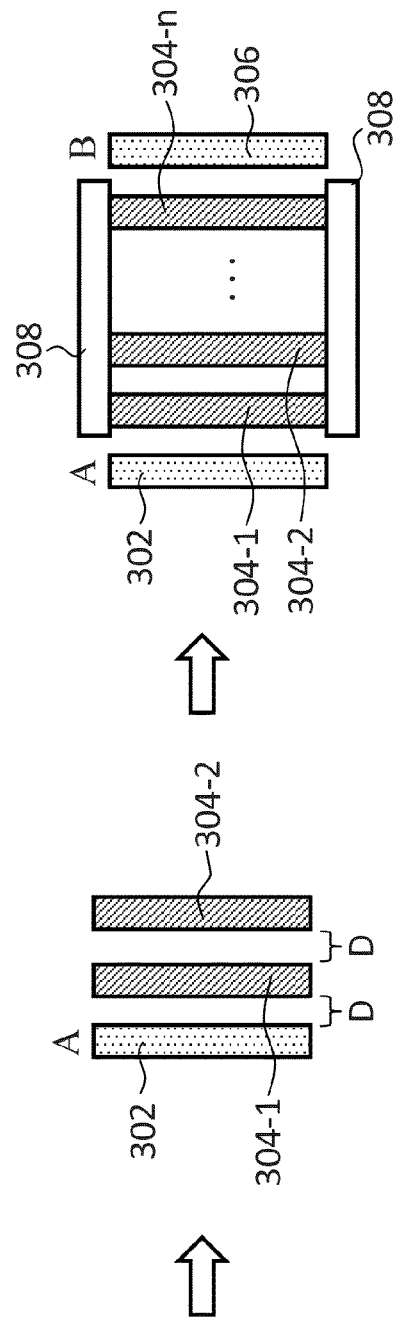

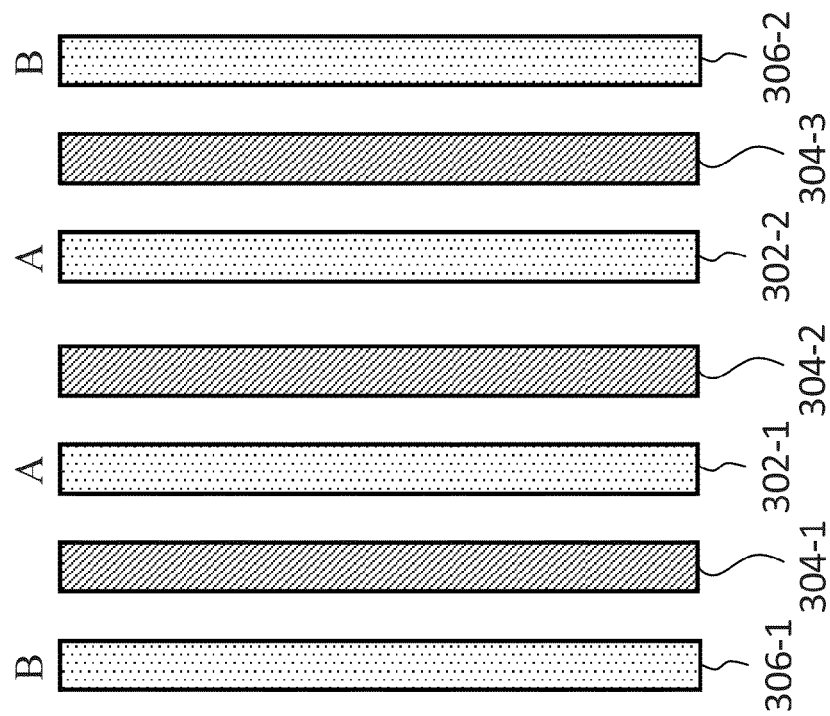
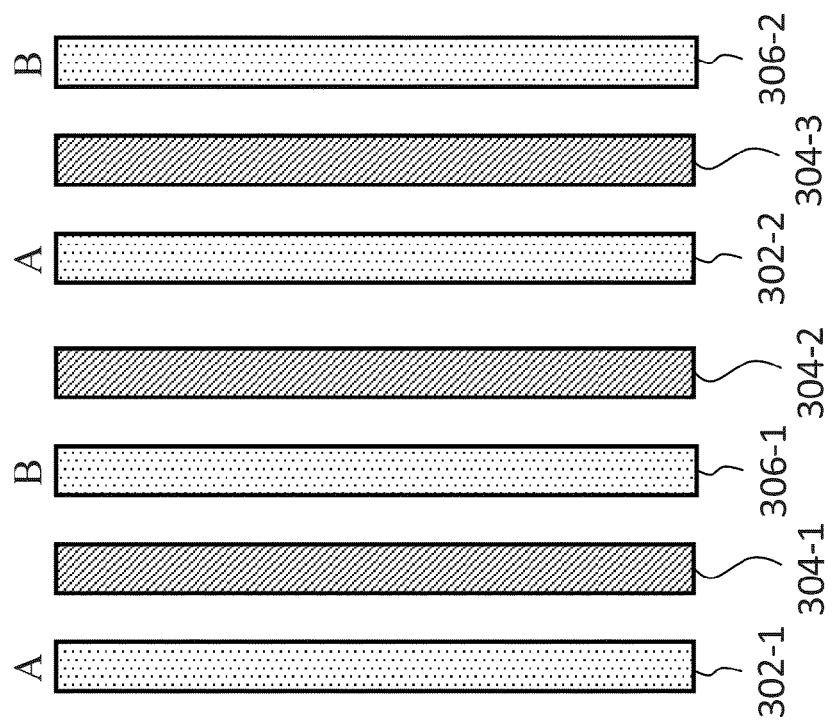

SYSTEM AND METHOD FOR ARBITRARY METAL SPACING FOR SELF-ALIGNED DOUBLE PATTERNING

CROSS-REFERENCE TO RELATED APPLICATIONS

This application claims priority to U.S. Provisional Patent Application No. 61/782,249, filed Mar. 14, 2013, the entirety of which is incorporated by reference herein.

FIELD OF DISCLOSURE

The disclosed system and method relate to semiconductor manufacturing. More particularly, the disclosed system and method relate to semiconductor manufacturing using self-aligned double patterning.

BACKGROUND

Double patterning is a technology developed for lithography to enhance feature density in semiconductor manufacturing. Lithography is typically implemented in which a photoresist is applied to a surface of a semiconductor wafer, and then patterns are defined in the photoresist. The patterns in the patterned photoresist defined in a lithographic mask and are implemented as a transparent portion or an opaque portion. In double patterning, two photolithography processes are performed on a single layer to overcome the optical proximity effect, which can lead to two features to blend into one another causing a short.

Self-aligned double patterning ("SADP") is a semiconductor process designed to reduce the number of photolithography steps needed to develop a single layer. SADP utilizes the creation of hard mask spacers to create additional patterns not formed in photolithography masks. The pattern created by the spacers are etched and filled to create additional patterns in the semiconductor substrate without the use of additional lithographic masks.

BRIEF DESCRIPTION OF THE DRAWINGS

FIG. 3A-3E illustrate a layout in various stages of the method of FIG. 2 in accordance with some embodiments.

FIG. 7A illustrates one example of a layout in which differential nets are interdigitated with one another and separated by peacekeeper structures in accordance with some embodiments.

FIG. 7B illustrates one example of differential nets are arranged in a common-centroid layout and separated from one another by peacekeeper structures in accordance with some embodiments.

DETAILED DESCRIPTION

This description of the exemplary embodiments is intended to be read in connection with the accompanying drawings, which are to be considered part of the entire written description.

In self-aligned double patterning ("SADP") processing, a lithographic mask for a single layer includes only a portion of the conductive (e.g., metal) traces that are to be patterned for the layer (e.g., layer M1, M2, M3, etc.). These conductive traces or lines are patterned by exposing a photoresist deposited over a semiconductor substrate. A spacer layer is formed to cover the semiconductor wafer including the patterned features. In some embodiments, the spacer layer includes silicon oxide, silicon nitride, silicon oxynitride, combinations therefor, or multi-layers thereof to list but only a few possibilities.

An etching step is performed on the spacer layer, which leaves sidewall spacers on the patterned features. A material is deposited between the sidewall spacers to fill the voids between the sidewall spacers. In some embodiments, the deposited material that fills the voids between sidewall spacers is a conductive material, such as a metal or doped silicon, deposited by physical vapor deposition ("PVD"), atomic layer deposition ("ALD"), chemical vapor deposition ("CVD"), or another deposition process. The wafer is planarized so the filled structures are at substantially the same height as the patterned structures.

Notably, the spacing between conductive lines in SADP processing is fixed, which does not cause any issues for low voltage operations (e.g., core devices). However, for higher voltage applications, e.g., input/output ("I/O") devices and/or analog blocks such as USB/SD3.0, the fixed metal spacing can produce insufficient breakdown voltages, $V_{BD}$, for some of the devices due to the close proximity of the metal layout.

The disclosed systems and methods utilize these SADP processing techniques to produce semiconductor devices capable of handling high voltage differentials (e.g., 0-3.3 volts). The improved ability to handle higher voltages is achieved through the use of a floating metal lines, sometimes referred to as a "peacekeeper metal" or "peacekeeper structure." The so-called peacekeeper metal or structure increases the spacing between adjacent nets, which can differ from one another in voltage potential up to, including, and beyond 3.3 volts. In some embodiments, the peacekeeper metal is cut to provide a floating metal or conductive line disposed between a pair of nets.

Figure 1:
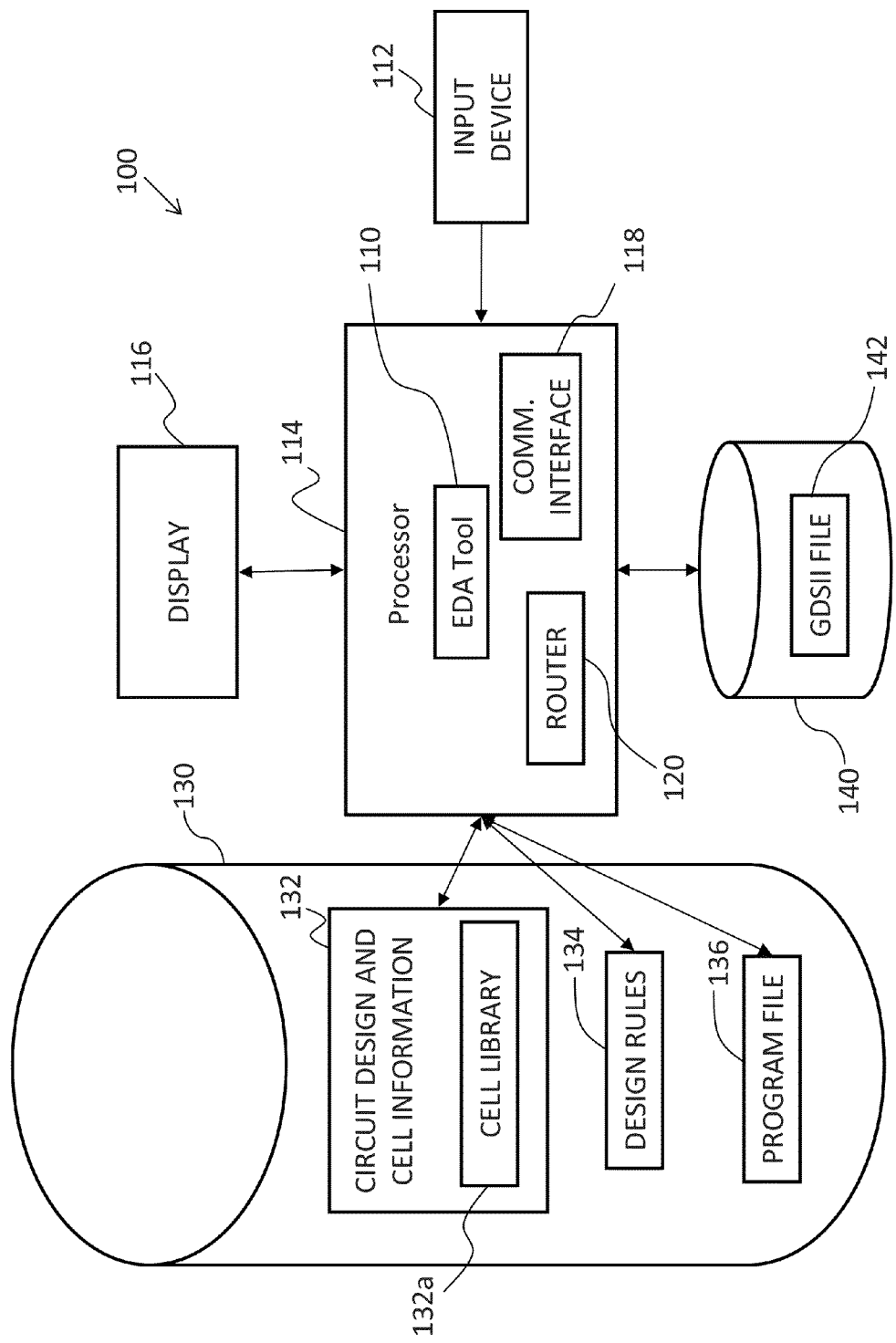
FIG. 1 is a block diagram of one example of a system for performing, at least partially, a method of designing and fabricating an integrated circuit utilizing self-aligned double patterning in accordance with some with some embodiments.

FIG. 1 illustrates one example of a system 100 configured to perform at least part of the method described below. As shown in FIG. 1, system 100 includes an electronic design automation ("EDA") tool 110 such as "IC COMPILER"™, sold by Synopsys, Inc. of Mountain View, Calif., having a place and route tool including a router 120 such as "ZROUTE"™, also sold by Synopsys. Other EDA tools 110 may be used, such as, for example, the "VIRTUOSO" custom design platform or the Cadence "ENCOUNTER"® digital IC design platform along with the "VIRTUOSO" chip assembly router 120, all sold by Cadence Design Systems, Inc. of San Jose, Calif.

The EDA tool 110 is a special purpose computer formed by retrieving stored program instructions 136 from a computer readable storage medium 130, 140 and executing the instructions on a general purpose processor 114. Processor 114 may be any central processing unit ("CPU"), microprocessor, micro-controller, or computational device or circuit for executing instructions. The non-transient machine readable storage medium 130, 140 may be a flash memory, random access memory ("RAM"), read only memory ("ROM"), or other storage medium. Examples of RAMs include, but are not limited to, static RAM ("SRAM") and dynamic RAM ("DRAM"). ROMs include, but are not limited to, programmable ROM ("PROM"), electrically programmable ROM ("EPROM"), and electrically erasable programmable ROM ("EEPROM"), to name a few possibilities.

System 100 may include a display 116 and a user interface or input device 112 such as, for example, a mouse, a touch screen, a microphone, a trackball, a keyboard, or other device through which a user may input design and layout instructions to system 100. The one or more computer readable storage mediums 130, 140 may store data input by a user such as a circuit design and cell information 132, which may include a cell library 132*a*, design rules 134, one or more program files 136, and one or more graphical data system ("GDS") II files 142.

EDA tool 110 may also include a communication interface 118 allowing software and data to be transferred between EDA tool 110 and external devices. Examples of a communications interface 118 include, but are not limited to, a modem, an Ethernet card, a wireless network card, a Personal Computer Memory Card International Association ("PCMCIA") slot and card, or the like. Software and data transferred via communications interface 218 may be in the form of signals, which may be electronic, electromagnetic, optical, or the like that are capable of being received by communications interface 118. These signals may be provided to communications interface 118 via a communications path (e.g., a channel), which may be implemented using wire, cable, fiber optics, a telephone line, a cellular link, a radio frequency ("RF") link and other communication channels.

Router 120 is capable of receiving an identification of a plurality of cells to be included in a circuit layout, including a list 132 of pairs of cells, selected from the cell library 132*a*, within the plurality of cells to be connected to each other. Design rules 134 may be used for a variety of processing technologies (e.g., technology greater than, less than, or equal to 45 nm). In some embodiments, the design rules 134 configure the router 120 to locate connecting lines and vias on a manufacturing grid. Other embodiments may allow the router to include off-grid connecting lines and/or vias in the layout.

Figure 2:
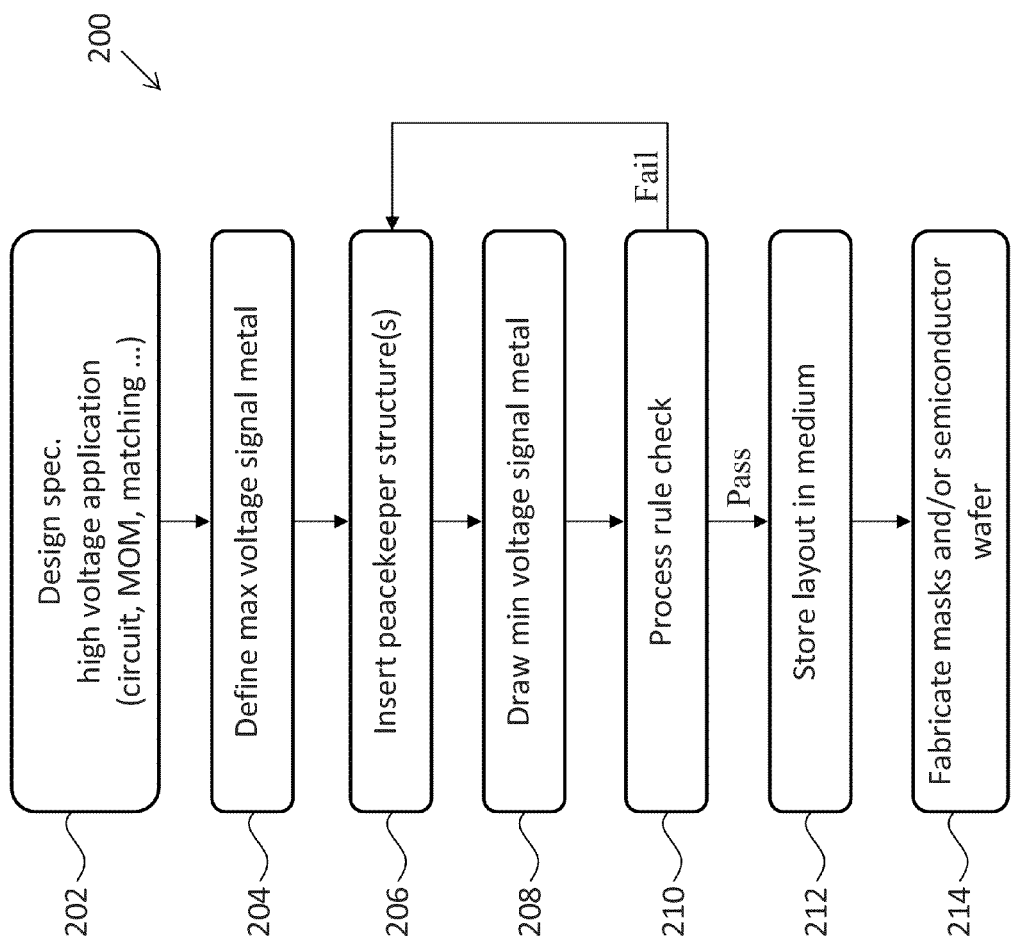
FIG. 2 is a flow diagram of one example of a method of designing and fabricating an integrated circuit utilizing self-aligned double patterning in accordance with some embodiments.

In some embodiments, system 100 is configured to perform some or all of a method in accordance with method 200 illustrated in FIG. 2. As shown in FIG. 2, a design specification is received at block 202. The design specification can be input by a user using input device 112 and/or the design specification can be received via communication interface 118 and stored in a computer readable storage medium 130, 140. In some embodiments, the design specification includes a number of parameters for an integrated circuit for use in high-voltage applications.

At block 204, a maximum voltage signal that is to be supported by a metal or conductive net 302 (FIG. 3A) is defined or otherwise inserted into the layout. In some embodiments, for example, the high-voltage signal between nets is defined as 3.3 volts; however, the high-voltage signal between nets can be higher or lower than 3.3 volts. FIG. 3A illustrates the metal or conductive line 302 for one of the nets, e.g., Net A, being defined. In some embodiments, Net A is the high-voltage net, or put another way, the metal conductor having a higher electrical potential than a second net, e.g., Net B, as described in greater detail below.

At block 206, one or more peacekeeper structures 304 are inserted into the design. For example, a peacekeeper structure 304 is inserted adjacent to metal line 302 for Net A at a distance, D, from metal line 302 as illustrated in FIG. 3B. In some embodiments, the distance D is the fixed spacing between conductive lines used for the SADP process.

At block 208, a metal line 306 for a second net, e.g., Net B, is defined at a distance, D, from peacekeeper structure 304 as illustrated in FIG. 3C. In some embodiments, for example, metal line 306 for Net B is spaced apart from peacekeeper structure 304 by the fixed spacing distance between conductive lines in the SADP process. Put another way, the distance between conductive line 306 and peacekeeper structure 304 is substantially the same distance as the distance between conductive structure 302 and peacekeeper structure 304 as one of ordinary skill in the art will understand that the distances may vary within specific tolerances for a semiconductor processing technology. The spacing between adjacent conductive structures of Nets A and B is less than 50 nm in some embodiments. In some embodiments, the width of Net A or Net B is substantially equal to the spacing, S. In some embodiments, the width of Net A or Net B is substantially equal to a multiple of the spacing, S. For example, the ratio of Net A or Net B to the spacing, S, can be substantially equal to 1:N, where N is a number that is greater than or equal to 1.

Metal cut areas 308 are also identified as shown in FIG. 3C. In some embodiments, metal cut areas 308 are formed using lithography and etching processes to remove the conductive material within the area defined by metal cut areas 308.

Figure 4:
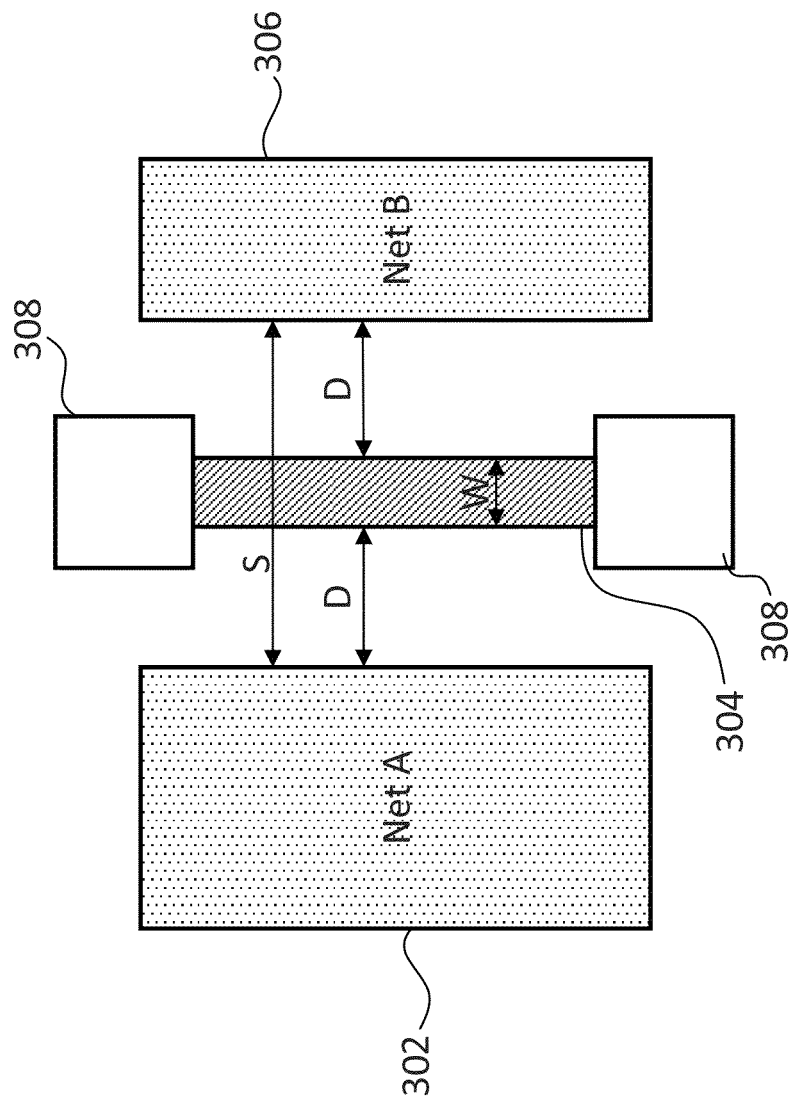
FIG. 4 is a detailed view of a peacekeeper structure disposed between differential nets in accordance with some embodiments.

FIG. 4 is a more detailed view of FIG. 3C and illustrates that the distance, D, between conductive line 302 and peacekeeper structure 304 is substantially the same as the distance, D, between peacekeeper structure 304 and conductive structure 306. As mentioned above, the distance D is the fixed spacing dimension between adjacent conductive lines for an SADP process in some embodiments. For example, in some embodiments, the distance D corresponds to a width of a sidewall spacer of photoresist or a sidewall spacer of a hard mask (e.g., $SiN_x$ or $SiO_x$). As will be understood by one of ordinary skill in the art, the distance, D, can have some variation in accordance with acceptable semiconductor processing variations. Thus, the total spacing, S, between conductive structures 302 and 306 is equal to the sum of twice the minimum spacing, D, and the width, W, of peacekeeper structure 304, i.e., S=2D+W. Thus, the addition of peacekeeper structure 304 increases the distance between adjacent conductive lines, 302, 306, of Nets A and B. This increased distanced between Net A and Net B increases the $V_{BD}$ of devices formed with these nets.

Referring again to FIG. 2, the integrated circuit is checked to determine if it complies with design rules 134 (FIG. 1) at block 210. For example, processor 114 is configured to simulate the performance of the designed integrated circuit in view of the design rules 134 stored in a computer readable storage medium 130, 140 as illustrated in FIG. 1. In some embodiments, other measurements or heuristics methods can be used to determine if the designed integrated circuit complies with design rules 134. The rules check is used to estimate if the integrated circuit will function properly over a range of operating conditions. In some embodiments, for example, the rules check at block 210 in FIG. 2 includes determining a breakdown voltage ($V_{BD}$) of a device including Nets A and B that are spaced apart from one another by one or more peacekeeper structures 304 (FIGS. 3B-3E).

If the integrated circuit fails the rules check at block 210 in FIG. 2 for a reason attributable to spacing between Nets A and B, e.g., the $V_{BD}$ of the structure is less than desired, then additional peacekeeper structure(s) 304 are inserted into the design at block 206. As illustrated in FIG. 3D, a second peacekeeper structure 304-2 is inserted adjacent to a first peacekeeper structure 304-1 at a distance, D, which is substantially the same as the distance between conductive line 302 and peacekeeper structure 304-1.

When a desired number of peacekeeper structure(s) 304 have been inserted adjacent to conductive line 302 (as illustrated in FIG. 3D), then the second conductive line 306 is provided at block 208 in FIG. 2 as described above. FIG. 3E illustrates an example of a second conductive line 306 separated from a first conductive line 302 by a number, n, of peacekeeper structures 304. In some embodiments, for example, the distance between directly adjacent peacekeeper structures 304, first conductive line 302 and a directly adjacent peacekeeper structure 304-1, and second conductive line 306 and a directly adjacent peacekeeper structure 304-n are equal to and correspond to a minimum fixed metal spacing for an SADP process in accordance with a particular technology node as set forth by the International Technology Roadmap for Semiconductors ("ITRS").

Figure 5:
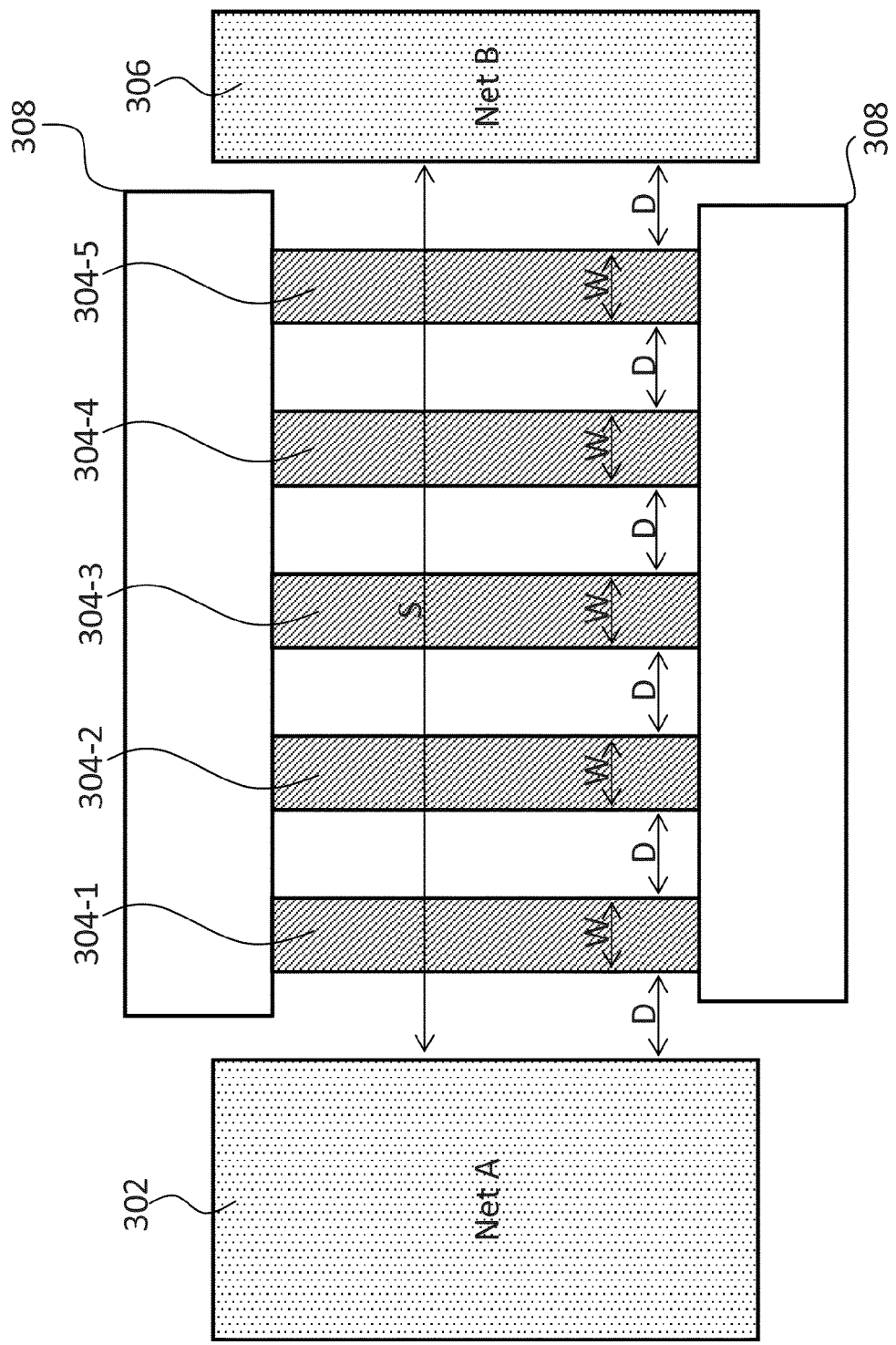
FIG. 5 illustrates one example of a layout in which a plurality of peacekeeper structures are disposed between differential nets in accordance with some embodiments.

FIG. 5 illustrates one example of metal lines 302 (Net A), 306 (Net B) separated by five peacekeeper structures 304-1, 304-2, 304-3, 304-4, 304-5. In some embodiments, the spacing, S, between metal line 302 of Net A and metal line 306 of Net B is equal to the sum of 6D and 5W. As described above, in some embodiments, the distance D corresponds to a width of a sidewall spacer of photoresist or a sidewall spacer of a hard mask (e.g., $SiN_x$ or $SiO_x$). As will be understood by one of ordinary skill in the art, the distance, D, can have some variation in accordance with acceptable semiconductor processing variations. In some embodiments, W is the width of the individual peacekeeper structures 304. Although five peacekeeper structures are illustrated in FIG. 5, it should be understood that fewer or more than five peacekeeper structures can be disposed between conductive lines 302 and 306. Metal cut lines 308 are associated with each of the peace keeper structures 304 for severing peacekeeper structures 304 from other conductive lines such that peacekeeper structures 304 are electrically floating.

Referring again to FIG. 2, the revised integrated circuit including the plurality of peacekeeper structures 304 is checked to determine if it complies with design rules 134 (FIG. 1) at block 210 as described above. If the integrated circuit fails the check at block 210, then method 200 illustrated in FIG. 2 iteratively continues to proceed through blocks 206, 208, and 210 as described above. When the integrated circuit passes the rule(s) check at block 210, then the integrated circuit layout design is completed at block 212, and a data file with the layout is stored in a computer readable storage medium 130, 140 (illustrated in FIG. 1) at block 212 of FIG. 2. In some embodiments, for example, a GDSII file 142 illustrated in FIG. 1 for an integrated circuit layout including one or more peacekeeper structures 304 is stored in a computer readable storage medium 130, 140.

At block 214 of FIG. 2, photolithography mask(s) are fabricated for the integrated circuit based on the stored GDSII file 142 illustrated in FIG. 1. In some embodiments, a semiconductor wafer including one or more integrated circuits including one or more peacekeeper structures 304 (FIGS. 3B-5) are fabricated at block 214 of FIG. 2 using an SADP process.

Figure 6A:
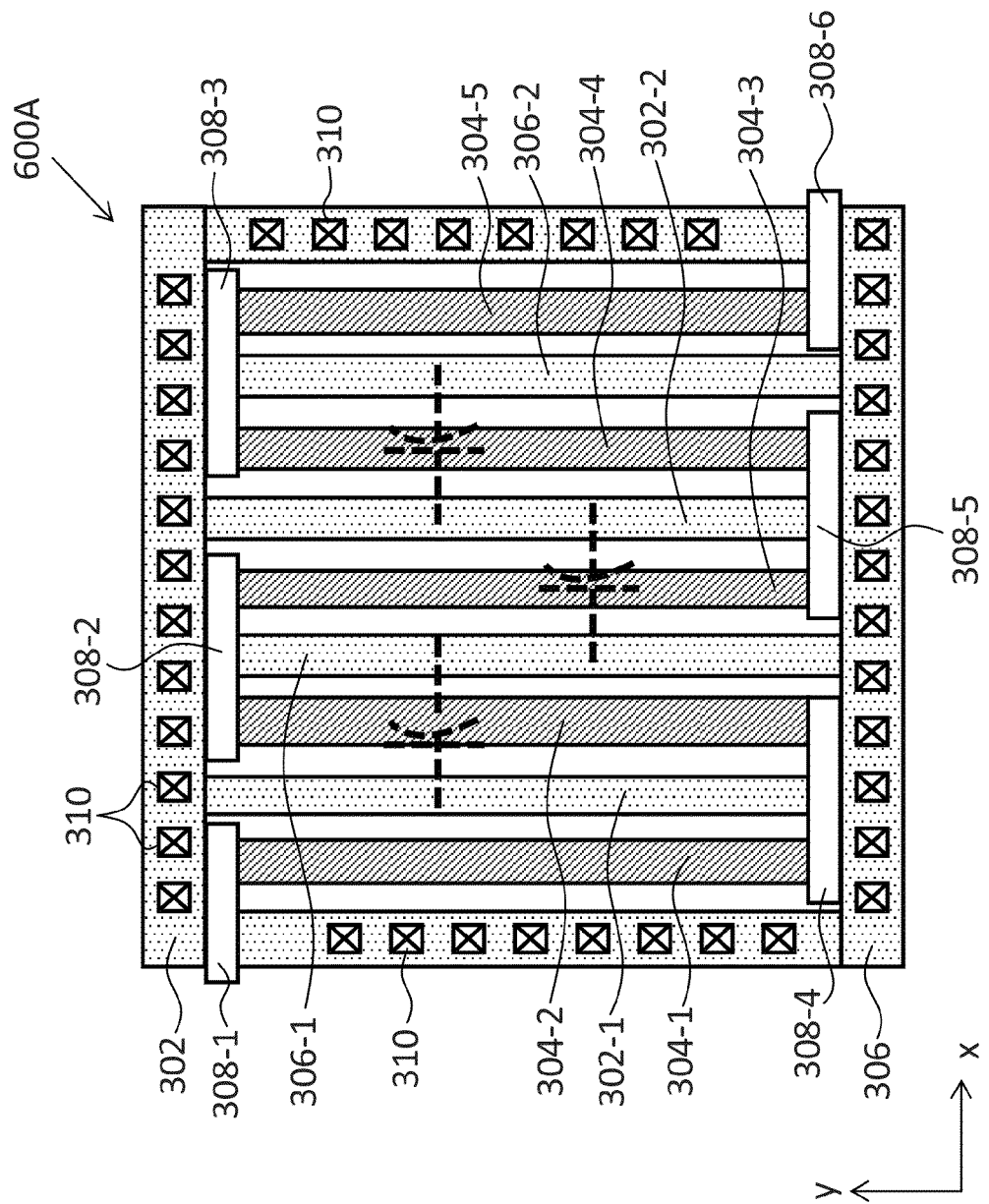
FIGS. 6A and 6B illustrate examples of layouts of MOM devices in which peacekeeper structures are used in accordance with some embodiments.

FIG. 6A illustrates one example of a layout 600A for a high-voltage metal-oxide-metal ("MOM") device. As shown in FIG. 6A, layout 600A includes a first power rail 302 set a first voltage potential to which a plurality of conductive lines 302-1, 302-2 that extend in the y-direction are coupled. A second power rail 306 is set a second voltage potential, which is different than the first voltage potential, and is coupled to a plurality of conductive lines 306-1, 306-2 that extend in the y-direction.

A peacekeeper structure 304-1 is disposed between the vertically (e.g., y-direction) extending portion of rail 306 and first conductive line 302-1. Peacekeeper structure 304-2 extends parallel to peacekeeper structure 304-1 and is disposed between conductive line 302-1, which is coupled to rail 302, and to conductive line 306-1, which is coupled to rail 306. Metal cut line 308-1 separates rails 302 and 306 and also renders peacekeeper structure 304-1 floating in combination with metal cut line 308-4, which separates conductive line 302-1 and peacekeeper structure 304-2 from rail 306. Peacekeeper structure 304-2 is separated from rail 302 by metal cut line 308-2.

Conductive line 306-1 extends vertically (e.g., in the y-direction) from power rail 306 and is separated from rail 302 by metal cut line 308-2. Peacekeeper structure 304-3 is disposed between conductive line 306-1 and conductive line 302-2 and is separated from power rails 302 and 306 by metal cut lines 308-2 and 308-5, respectively. Metal cut line 308-5 separates peacekeeper structure 304-4 from rail 306, and metal cut line 308-3 separates peacekeeper lines 304-4 and 304-5 from rail 302. Metal cut line 308-6 separates peacekeeper line 304-5 and rail 302 from rail 306.

Via contacts 310 are used to couple rails 302 and 306 to other metal layers (e.g., M1, M2, M3, etc.), which are vertically (e.g., z-direction) disposed above or below the metal layer illustrated in FIG. 6A. For example, vias (not shown) extend in a direction perpendicular to the x- and y-directions shown in FIG. 6A, i.e., into and out of the page, and couple conductive lines and rails illustrated in FIG. 6A to conductive lines and rails disposed in other metal layers.

Figure 6B:
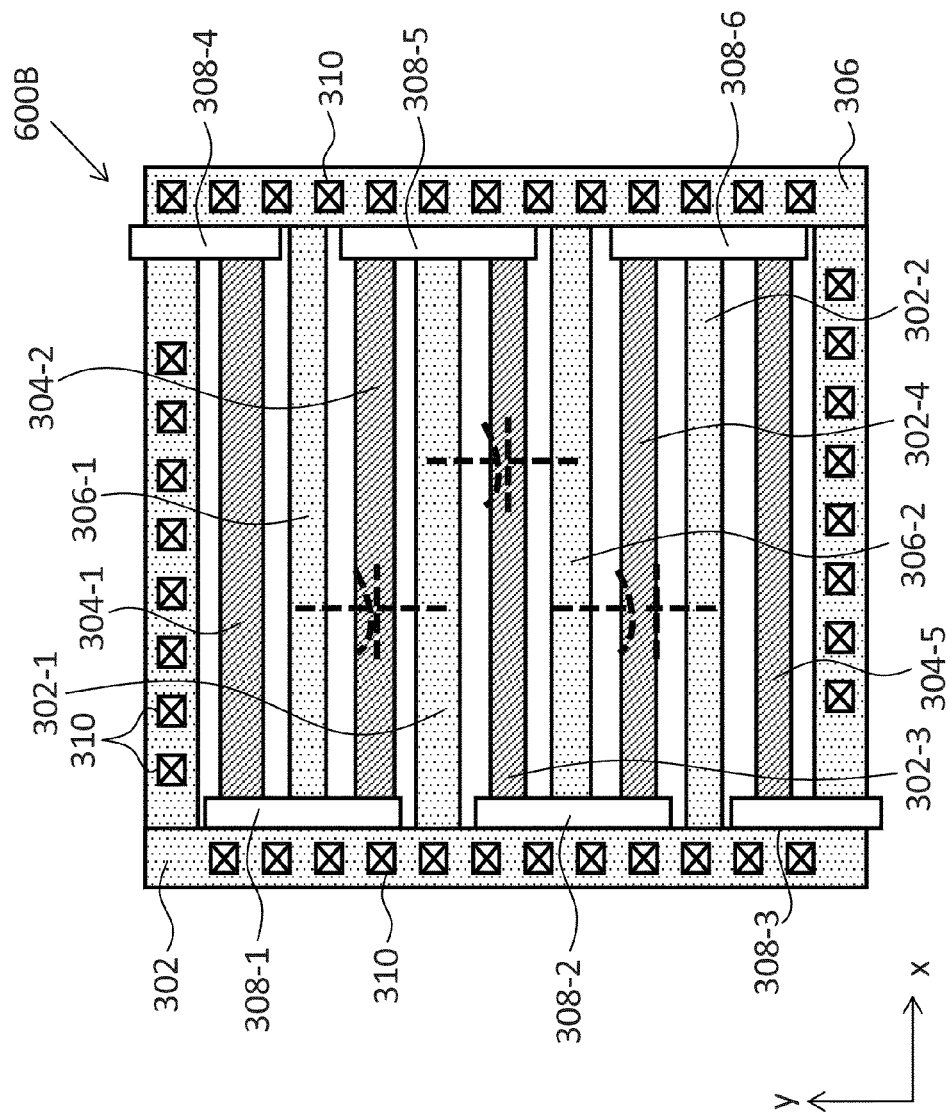

FIG. 6B illustrates another example of a layout 600B, which can be formed in a different metal layer than the metal layer in which layout 600A is formed. Layout 600B includes a first voltage rail 302 and a second voltage rail 306 that are separated from one another by metal cut lines 308-3 and 308-4. First and second conductive lines 302-1 and 302-2 are coupled to rail 302 with conductive line 302-1 being separated from rail 306 by metal cut line 308-5 and conductive line 302-2 being separated from rail 306 by metal cut line 308-6. Conductive lines 306-1 and 306-2 are coupled to rail 306 and are separated from rail 302 by metal cut lines 308-1 and 308-2, respectively.

Peacekeeper structure 304-1 is disposed between a portion of rail 302 that extends in the x-direction and conductive line 306-1, which extends parallel to peacekeeper structure 304-1. Metal cut lines 308-1 and 308-4 separate peacekeeper structure 304-1 from rails 302 and 306 such that peacekeeper structure 304-1 is at a floating voltage level.

Metal cut lines 308-1 and 308-5 separate peacekeeper structure 304-2, which is disposed between conductive lines 306-1 and 302-1, from rails 302 and 306, respectively. Peacekeeper structure 302-3 is disposed between conductive lines 302-1 and 306-2 and is separated from rails 302 and 306 by metal cut lines 308-2 and 308-5, respectively. Metal cut lines 308-2 and 308-6 separate peacekeeper structure 302-4, which is disposed between conductive lines 306-2 and 302-2, from rails 302 and 306. Peacekeeper structure 304-5 is disposed between conductive line 302-2 and a portion of rail 306 and is separated from rails 302 and 306 by metal cut lines 308-3 and 308-6, respectively.

The manner in which different nets are arranged can be varied. For example, FIG. 7A illustrates an example of a layout in which differential nets are interdigitated with one another and separated by peacekeeper structures 304. For example, conductive line 302-1 of Net A is separated from conductive line 306-1 of Net B by peacekeeper structure 304-1 without any intervening conductive lines 302, 306. Conductive line 306-1 of Net B is separated from another conductive line 302-2 of Net A by peacekeeper structure 304-2, and conductive line 302-2 of Net A is separated from conductive structure 306-2 of Net B by a peacekeeper structure 304-3. Thus, the embodiment illustrated in FIG. 7A includes conductive lines of different nets arranged in an interdigitated or interleaved manner (e.g., Net A, Net B, Net A, Net B, etc.).

FIG. 7B illustrates an example of a layout in which conductive lines 302-1 and 302-2 of Net A are disposed adjacent to one another without another intervening conductive line 302, 306. Conductive lines 302-1 and 302-2 are separated from one another by peacekeeper structure 302-2. Conductive line 302-1 of Net A is separated from conductive line 306-1 of Net B by peacekeeper structure 304-1, and conductive line 302-2 of Net A is separated from conductive line 306-2 of Net B by peacekeeper structure 304-2. Such an arrangement is sometimes referred to as a "common centroid" arrangement.

Figure 8:
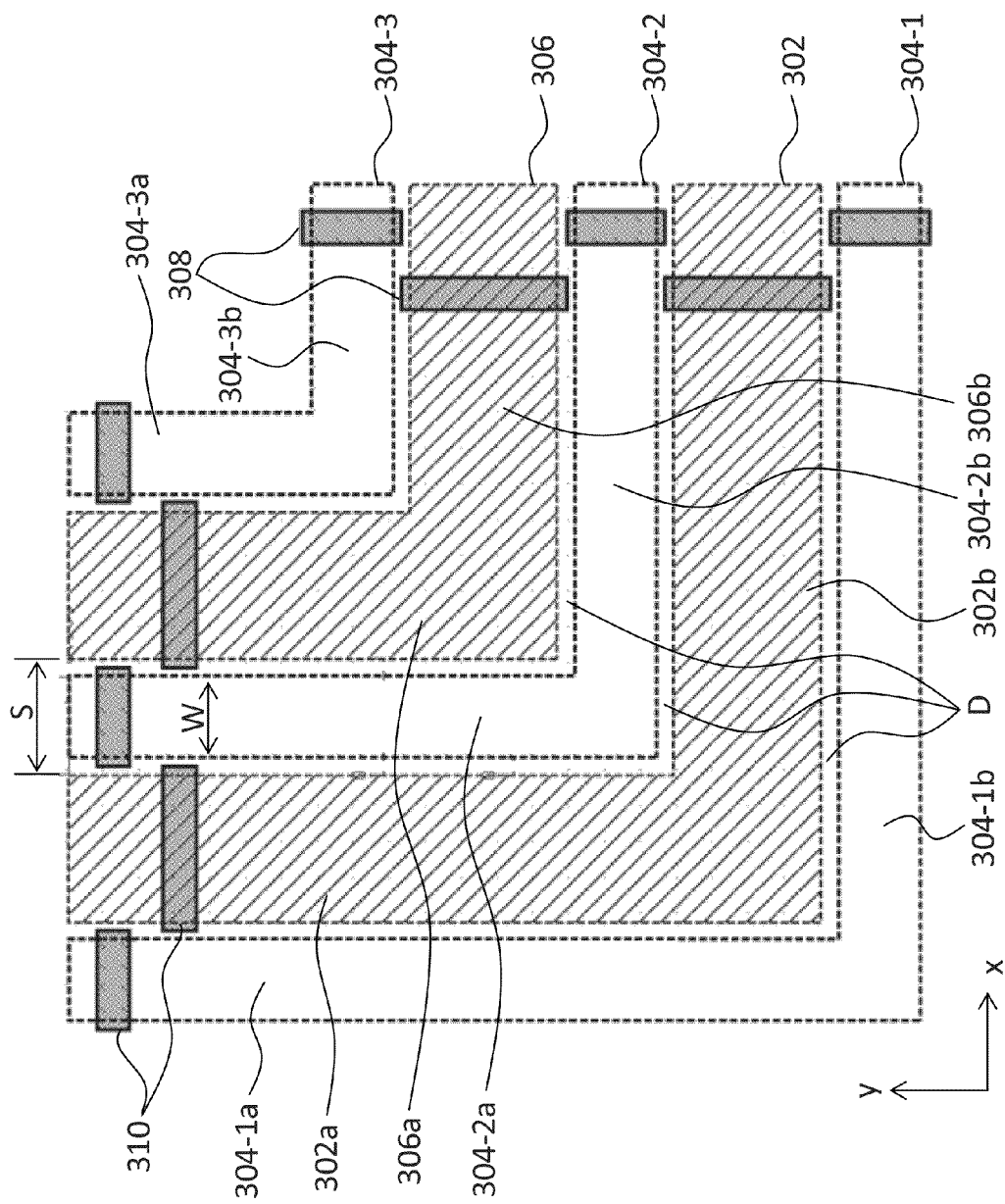
FIG. 8 illustrates one example of an "L" shape layout of differential nets separated by peacekeeper structures in accordance with some embodiments.

FIG. 8 illustrates one example of a possible layout referred to as an "L" shape. As shown in FIG. 8, conductive structure 302 includes a first portion 302a extending in a first direction (e.g., y-direction) and a second portion 302b extending away from the first portion 302a in a second direction (e.g., x-direction) that is perpendicular to the first direction. A first peacekeeper structure 304-1 also having an L-shape is disposed adjacent to conductive structure 302 and includes a pair of divergent legs 304-1a and 304-1b. Peacekeeper structure 304-1 is separated from conductive structure 302 by a spacing D, which as described above corresponds to a width of a sidewall spacer of photoresist or a sidewall spacer of a hard mask (e.g., $SiN_x$ or $SiO_x$) in some embodiments. As will be understood by one of ordinary skill in the art, the distance, D, can have some variation in accordance with acceptable semiconductor processing variations.

A second peacekeeper structure 304-2 is disposed adjacent to conductive structure 302 on side that is disposed opposite to the side on which peacekeeper structure 304-1 is disposed. Peacekeeper structure 304-2 also includes a pair of divergent lines 304-2a and 304-2b with line 304-2a extending in the y-direction and line 304-2b extending in the x-direction. Peacekeeper structure 304-2 is spaced from conductive structure 302 by spacing D.

A second conductive structure 306 is disposed adjacent to peacekeeper structure 304-2 such that peacekeeper structure 304-2 is disposed between conductive structures 302 and 306. Conductive structure 306 is also L-shaped with a first line 306a extending in the y-direction and a second line 306b extending in the x-direction. Conductive structure 306 separated from peacekeeper structure 304-2 by a spacing D. A third peacekeeper structure 304-3 can be disposed adjacent to conductive structure 306 and separated from conductive structure by spacing D. With the conductive structures 302, 306 separated from one another by peacekeeper structure 304-2, the total distance, S, between structures 302, 306 is equal to the sum of 2D and width, W, of peacekeeper structure 304-2. In some embodiments, each of the conductive structures 302, 306 and peacekeeper structures 304 (i.e., 304-1, 304-2, and 304-3) include metal cut regions 308 along their lengths.

Figure 9:
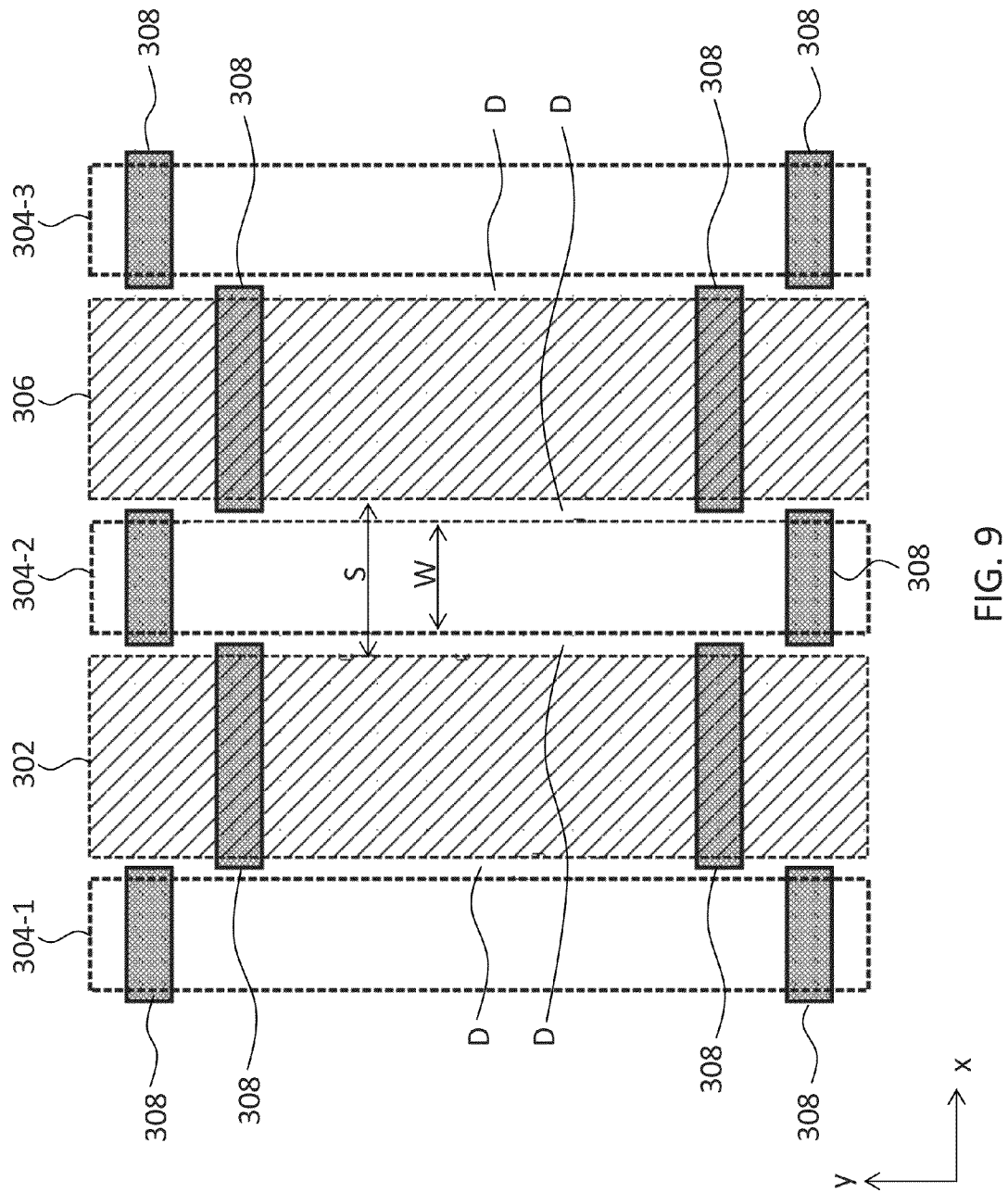
FIG. 9 illustrates one example of a linear layout of differential nets separated by peacekeeper structures in accordance with some embodiments.

FIG. 9 illustrates one example of a possible layout referred to as an "I" shape. As shown in FIG. 9, a peacekeeper structure 304-2 is disposed between conductive structures 302, 306 such that conductive structures 302, 306 are separated from one another by a distance S, which is equal to the sum of W (i.e., the width of peacekeeper structure 304-2) and 2D (i.e., twice the minimum spacing distance D between peacekeeper structure 304-2 and conductive structures 302, 306). Metal cut regions 308 are used to separate conductive structures 302, 306 and peacekeeper structures 304 from other devices or structures.

Figure 10:
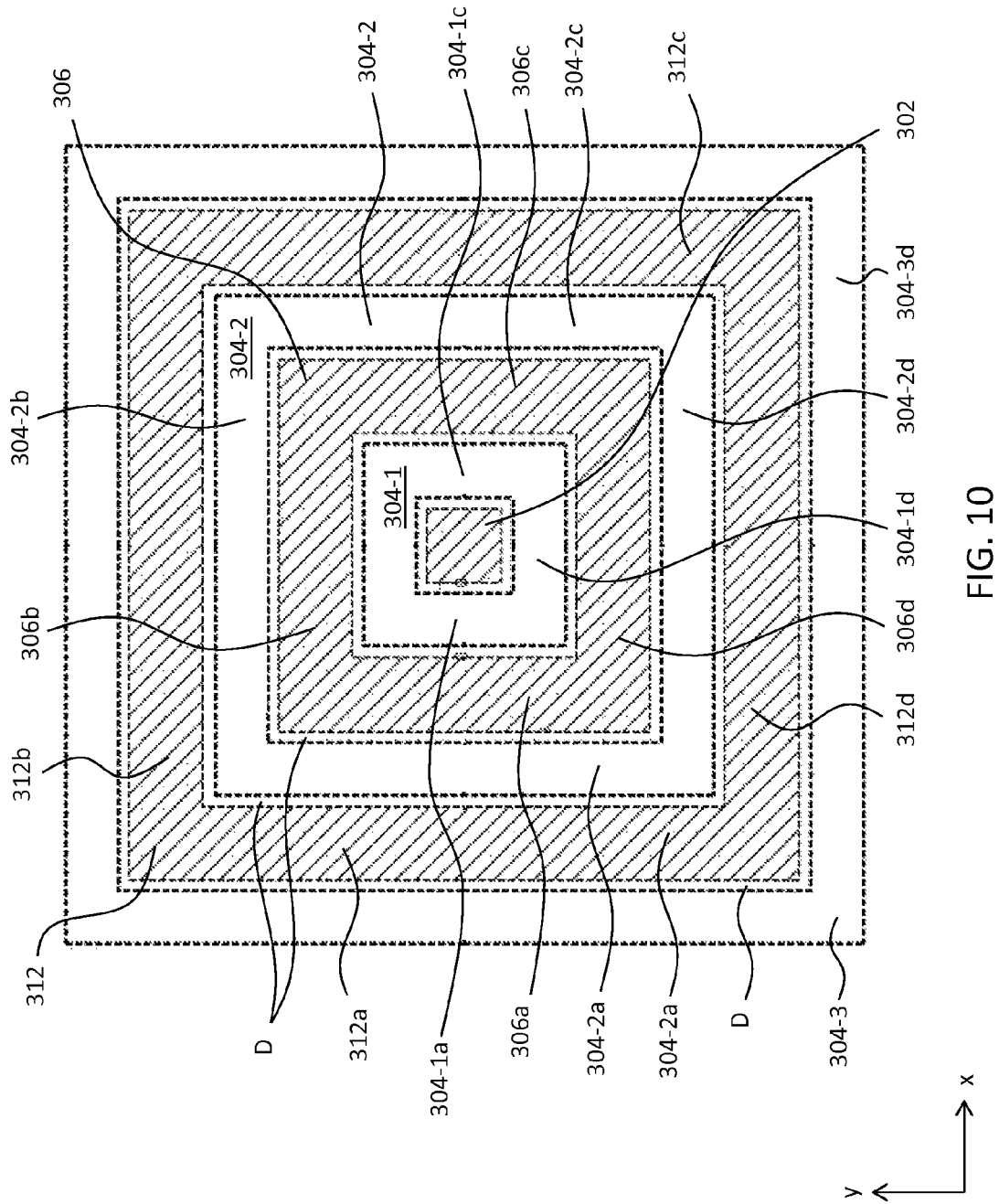
FIG. 10 illustrates one example of an "O" shape layout of differential nets separated by peacekeeper structures in accordance with some embodiments.

FIG. 10 illustrates one example of a possible layout referred to as an "O" shape. The example illustrated in FIG. 10 includes three conductive structures 302, 306, 312, which are separated from one another by peacekeeper structures 304-1, 304-2, respectively. Conductive structure 302 has a rectangular shape and is surrounded on all four sides by peacekeeper structure 304-1. Peacekeeper structure 304-1 includes four segments 304-1a, 304-1b, 304-1c, and 304-1d. Segments 304-1a and 304-1c extend in the y-direction, and segments 304-1b and 304-1d extend in the x-direction.

Conductive structure 306 includes four segments 306a, 306b, 306c, 306d and surrounds all four sides of peacekeeper structure 304-1. Segments 306a and 306c extend along segments 304-1a and 304-1c of peacekeeper structure 304-1, respectively, and segments 306b and 306d extend along segments 304-1b and 304-1d, respectively. Conductive structure 306 is surrounded by peacekeeper structure 304-2, which includes four segments 304-2a, 304-2b, 304-2c, and 304-2d. Peacekeeper structure 304-2 is surrounded by conductive structure 312 where each segment 312a, 312b, 312c, and 312d is disposed adjacent a respective segment 304-2a, 304-2b, 304-2c, and 304-2d of peacekeeper structure 304-2.

A third peacekeeper structure 304-3 is shown surrounding conductive structure 312. Like the other peacekeeper structure 304 illustrated in FIG. 10, peacekeeper structure 304-3 includes four segments 304-3a, 304-3b, 304-3c, and 304-3d each of which is disposed adjacent to a respective segment 312a, 312b, 312c, and 312d of conductive structure 312. Each peacekeeper segment 304-1, 304-2 disposed between conductive structures 302, 306, 312 is disposed between a spacer, D, which can correspond to a width of a sidewall spacer of photoresist or a sidewall spacer of a hard mask (e.g., $SiN_x$ or $SiO_x$) as described above. As will be understood by one of ordinary skill in the art, the distance, D, can have some variation in accordance with acceptable semiconductor processing variations.

The peacekeeper structures 304 illustrated in FIG. 10 can be floating even in the absence of metal cut layers 308. In some embodiments, the peacekeeper structures 304 have voltage potentials that are between the voltage potential of the adjacent conductive structures 302, 306, 312. For example, peacekeeper structure 304-1 can have a voltage potential that is between the voltage potentials of conductive structure 302 and 306, and peacekeeper structure 304-2 can have a voltage potential that is between the voltage potentials of conductive structure 306 and 312.

Figure 11:
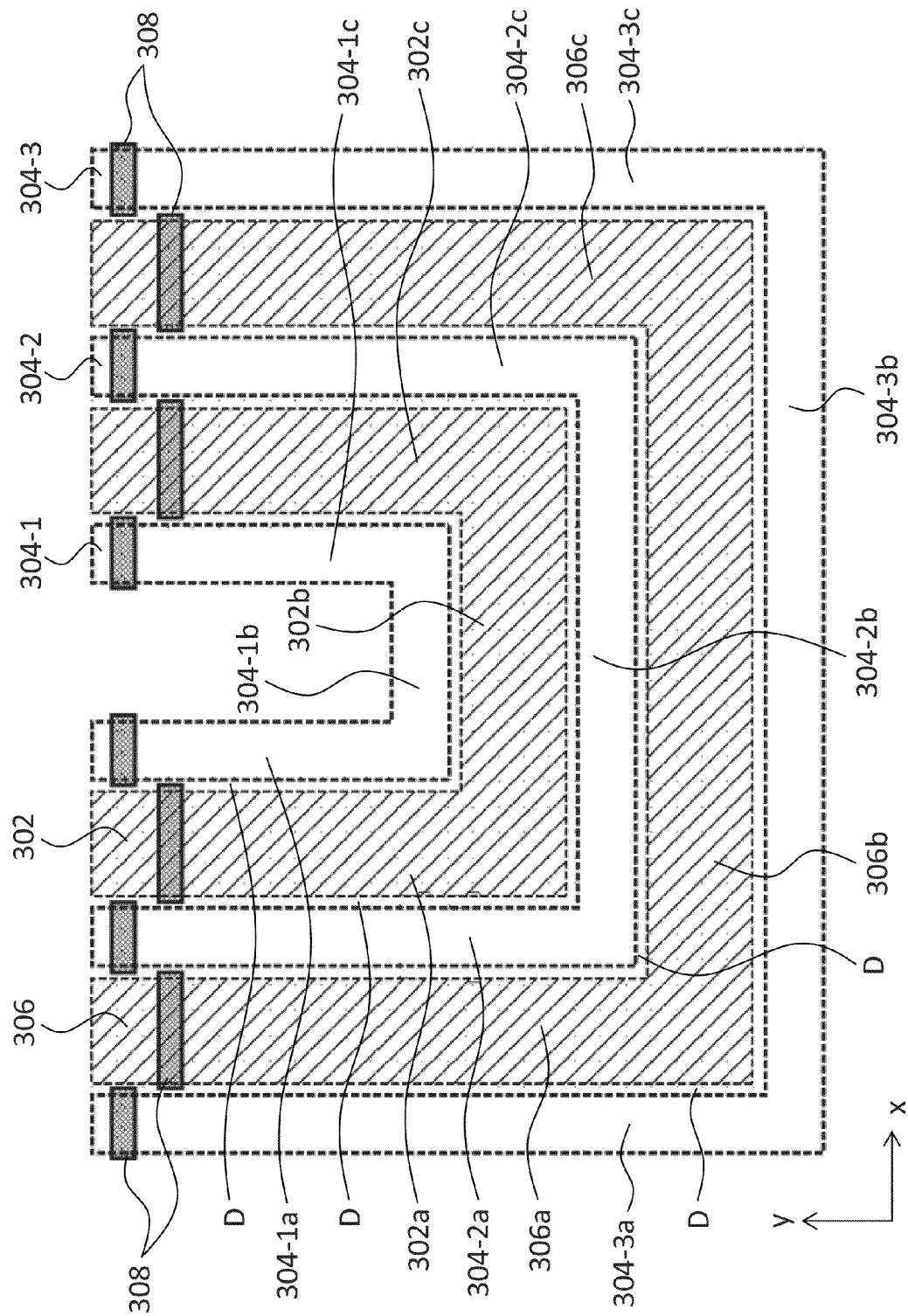
FIG. 11 illustrates one example of an "U" shape layout of differential nets separated by peacekeeper structures in accordance with some embodiments.

FIG. 11 illustrates one example of a possible layout referred to as an "U" shape. As shown in FIG. 11, a conductive structure 302 includes a pair of parallel legs 302a, 302c that extend in the y-direction, and a transverse leg 302b that extends in the x-direction. Conductive structure 302 is disposed between peacekeeper structures 304-1, 304-2 each having three segments 304-1a, 304-2a, 304-1b, 304-2b, 304-1c, 304-2c.

A second conductive structure 306 comprising three segments 306a, 306b, 306c is disposed between peacekeeper structures 304-2 and 304-3. Peacekeeper structure 304-3, like peacekeeper structures 304-1 and 304-2, includes three segments 304-3a, 304-3b, 304-3c with segments 304-3a and 304-3c extending in the y-direction, and segment 304-3b extending in the x-direction.

Thus, in the examples illustrated in FIGS. 8-11, the peacekeeper structures 304 follow the patterns of the low or high voltage nets, e.g., conductive structures 302, 306, 312. Although L-, O-, and U-shapes are shown, conductive structures 302, 306, 312 and peacekeeper structures 304 can have other shapes. Additionally, the peacekeeper structures 304 can be disposed on one more metal layers, e.g., M1, M2, M3, etc., and can be coupled to each other by vias in a routing layout.

In some embodiments, a method includes determining a response of a circuit having a first layout including a first peacekeeper structure disposed between a first conductive structure and a second conductive structure, determining a breakdown voltage of a device including the first conductive structure and a second conductive structure, and storing a design of the first circuit in a computer readable storage medium if the breakdown voltage of the device is above a threshold voltage. The first conductive structure has a first voltage level that is greater than a second voltage level of the second conductive structure. The first and second conductive structures are disposed at a distance from one another that is greater than or equal to a sum of a width of the peacekeeper structure and twice a fixed spacing distance for conductive lines for a self-aligned double patterning ("SADP") process that is to be used to fabricate the circuit.

In some embodiments, simulating the response of the first circuit includes using a processor.

In some embodiments, the method includes modifying a layout of the circuit to create a second layout for the first circuit to create a second layout if the breakdown voltage of the device is below the threshold, and determining the response of the circuit having the second layout. The device in the second layout includes a plurality of peacekeeper structures disposed between the first conductive structure and the second conductive structure.

In some embodiments, a method includes fabricating a mask for the circuit based on the design stored in the computer readable storage medium. The mask includes patterns for forming the first conductive structure but not for forming the peacekeeper structure.

In some embodiments, each of the first conductive structure and the second conductive structure have at least one of the following shapes: an L-shape with a pair of divergent legs, a U-shape with a pair of parallel legs connected together by a transverse segment, and an O-shape including a first pair of parallel segments and a second pair of parallel segments that extend perpendicular with respect to the first pair of parallel segments.

In some embodiments, the peacekeeper structure is a floating metal structure.

In some embodiments, the peacekeeper structure is separated from at least another of a peacekeeper structure or a conductive structure by a metal cut line.

In some embodiments, an integrated circuit includes a first conductive structure of a device configured to have a first voltage potential, a second conductive structure of the device configured to have a second voltage potential that is different than the first voltage potential, and a peacekeeper structure disposed between and separating the first conductive structure and the second conductive structure. The peacekeeper structure is separated from at least one of the first conductive structure and the second conductive structure by a fixed spacing distance for conductive lines for a self-aligned double patterning ("SADP") process from the integrated circuit was formed.

In some embodiments, a second peacekeeper structure is disposed between the first conductive structure and the second conductive structure.

In some embodiments, a plurality of peacekeeper structures are disposed between the first conductive structure and the second conductive structure.

In some embodiments, the peacekeeper structure is a floating metal structure.

In some embodiments, the peacekeeper structure is configured to have a third voltage potential that is between the first voltage potential and the second voltage potential.

In some embodiments, the first conductive structure includes a first segment extending in a first direction and a second segment connected to the first conductive structure, and the second conductive segment extends in a second direction that is different from the first direction.

In some embodiments, the first conductive structure includes a pair of parallel segments extending in a first direction and a transverse segment that connects the pair of parallel segments.

In some embodiments, the first conductive structure includes a first pair of parallel segments and a second pair of parallel segments. The first pair of parallel segments is connected to the second pair of parallel segments and extends in a first direction that is different from a second direction in which the second pair of parallel segments extend.

In some embodiments, the peacekeeper structure has a shape that is complementary to a shape of the first conductive structure.

In some embodiments, a non-transient machine readable storage medium is encoded with program code, wherein when the program code is executed by a processor, the processor performs a method. The method includes determining a response of a circuit having a first layout including a first peacekeeper structure disposed between a first conductive structure and a second conductive structure, and determining a breakdown voltage of a device including the first conductive structure and a second conductive structure. The first conductive structure has a first voltage level that is greater than a second voltage level of the second conductive structure. The first and second conductive structures are disposed at a distance from one another that is greater than or equal to a sum of a width of the peacekeeper structure and twice a fixed spacing distance for conductive lines for a self-aligned double patterning ("SADP") process that is to be used to fabricate the circuit.

In some embodiments, a method includes determining a response of the circuit having a second layout that includes a plurality of peacekeeper structures disposed between the first conductive structure and the second conductive structure.

In some embodiments, the peacekeeper structure is a floating metal structure.

In some embodiments, the peacekeeper structure is separated from at least another of a peacekeeper structure or a conductive structure by a metal cut line.

The disclosed systems and methods can be embodied, at least partially, in the form of methods and apparatus for practicing those methods. The disclosed systems and methods can also be embodied, at least partially, in the form of program code embodied in tangible media, such as floppy diskettes, CD-ROMs, DVD-ROMs, Blu-ray disks, hard drives, USB flash drives, or any other machine-readable storage medium, wherein, when the program code is loaded into and executed by a machine, such as a computer, the machine becomes an apparatus for practicing the invention. The disclosed systems and methods can also be embodied, at least partially, in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the method. When implemented on a general-purpose processor, the program code segments combine with the processor to provide a unique device that operates analogously to specific logic circuits.

Although the systems and methods have been described in terms of exemplary embodiments, they are not limited thereto. Rather, the appended claims should be construed broadly, to include other variants and embodiments of the invention, which may be made by those skilled in the art without departing from the scope and range of equivalents of the systems and methods.

What is claimed is:

1. A method, comprising:
    determining, using a processor, a response of a circuit having a first layout including a first peacekeeper structure disposed between a first conductive structure and a second conductive structure, the first conductive structure having a first voltage level that is greater than a second voltage level of the second conductive structure;
    determining a breakdown voltage of a device including the first conductive structure and a second conductive structure; and
    storing a design of the first circuit in a non-transitory computer readable storage medium if the breakdown voltage of the device is above a threshold voltage,
    wherein the first and second conductive structures are disposed at a distance from one another that is greater than or equal to a sum of a width of the peacekeeper structure and twice a fixed spacing distance for conductive lines for a self-aligned double patterning ("SADP") process that is to be used to fabricate the circuit.

2. The method of claim 1, further comprising:
    modifying a layout of the circuit to create a second layout for the first circuit to create a second layout if the breakdown voltage of the device is below the threshold; and
    determining the response of the circuit having the second layout,
    wherein the device in the second layout includes a plurality of peacekeeper structures disposed between the first conductive structure and the second conductive structure.

3. The method of claim 1, further comprising fabricating a mask for the circuit based on the design stored in the computer readable storage medium, wherein the mask includes patterns for forming the first conductive structure but not for forming the peacekeeper structure.

4. The method of claim 1, wherein each of the first conductive structure and the second conductive structure have at least one of the following shapes: an L-shape with a pair of divergent legs, a U-shape with a pair of parallel legs connected together by a transverse segment, and an O-shape including a first pair of parallel segments and a second pair of parallel segments that extend perpendicular with respect to the first pair of parallel segments.

5. The method of claim 1, wherein the peacekeeper structure is a floating metal structure.

6. The method of claim 5, wherein the peacekeeper structure is separated from at least another of a peacekeeper structure or a conductive structure by a metal cut line.

7. A non-transitory machine readable storage medium encoded with program code, wherein when the program code is executed by a processor, the processor performs a method, the method comprising
    determining a response of a circuit having a first layout including a first peacekeeper structure disposed between a first conductive structure and a second conductive structure, the first conductive structure having a first voltage level that is greater than a second voltage level of the second conductive structure; and
    determining a breakdown voltage of a device including the first conductive structure and a second conductive structure,
    wherein the first and second conductive structures are disposed at a distance from one another that is greater than or equal to a sum of a width of the peacekeeper structure and twice a fixed spacing distance for conductive lines for a self-aligned double patterning ("SADP") process that is to be used to fabricate the circuit.

8. The non-transitory machine readable storage medium of claim 7, wherein the method includes determining a response of the circuit having a second layout that includes a plurality of peacekeeper structures disposed between the first conductive structure and the second conductive structure.

9. The non-transitory machine readable storage medium of claim 7, wherein the peacekeeper structure is a floating metal structure.

10. The non-transitory machine readable storage medium of claim 7, wherein the peacekeeper structure is separated from at least another of a peacekeeper structure or a conductive structure by a metal cut line.

11. A method, comprising:
    determining, using a processor, a response of a circuit having a first layout including a first peacekeeper structure disposed between a first conductive structure and a second conductive structure, the first conductive structure having a first voltage level that is greater than a second voltage level of the second conductive structure;
    determining a breakdown voltage of a device including the first conductive structure and a second conductive structure; and
    storing a design of the first circuit in a non-transitory computer readable storage medium if the breakdown voltage of the device is above a threshold voltage,
    wherein the first and second conductive structures are disposed at a distance from one another that is greater than or equal to a sum of a width of the peacekeeper structure and twice a fixed spacing distance for conductive lines for a self-aligned double patterning ("SADP") process that is to be used to fabricate the circuit, and wherein the first peacekeeper structure includes a floating metal structure.

12. The method of claim 11, further comprising:
modifying a layout of the circuit to create a second layout for the first circuit to create a second layout if the breakdown voltage of the device is below the threshold; and
determining the response of the circuit having the second layout,
wherein the device in the second layout includes a plurality of peacekeeper structures disposed between the first conductive structure and the second conductive structure.

13. The method of claim 11, further comprising fabricating a mask for the circuit based on the design stored in the non-transitory computer readable storage medium,
wherein the mask includes patterns for forming the first conductive structure but not for forming the peacekeeper structure.

14. The method of claim 11, wherein each of the first conductive structure and the second conductive structure have at least one of the following shapes: an L-shape with a pair of divergent legs, a U-shape with a pair of parallel legs connected together by a transverse segment, and an O-shape including a first pair of parallel segments and a second pair of parallel segments that extend perpendicular with respect to the first pair of parallel segments.

15. The method of claim 11, wherein the peacekeeper structure is separated from at least another of a peacekeeper structure or a conductive structure by a metal cut line.

* * * * *